US006185866B1

United States Patent
Enfaradi

(10) Patent No.: US 6,185,866 B1
(45) Date of Patent: Feb. 13, 2001

(54) PLANT WATERER APPARATUS

(76) Inventor: Abbas Enfaradi, P.O. Box 18927, Altanta, GA (US) 31126

( * ) Notice: Under 35 U.S.C. 154(b), the term of this patent shall be extended for 0 days.

(21) Appl. No.: 09/066,795

(22) Filed: Apr. 27, 1998

(51) Int. Cl.[7] ................................................. A01G 25/00
(52) U.S. Cl. ................................................. 47/79; 47/48.5
(58) Field of Search ........................................ 47/79, 48.5

(56) References Cited

U.S. PATENT DOCUMENTS

| | | | |
|---|---|---|---|
| 1,453,401 | * 5/1923 | Mattson | 47/79 |
| 3,357,129 | 12/1967 | Torrence . | |
| 4,115,951 | * 9/1978 | Becker et al. | 47/48.5 |
| 4,961,285 | * 10/1990 | Jenkins et al. | 47/79 |
| 5,097,626 | 3/1992 | Mordoch . | |
| 5,212,905 | 5/1993 | Philoctete . | |
| 5,259,142 | * 11/1993 | Sax | 47/48.5 |
| 5,421,122 | 6/1995 | Hyndman . | |
| 5,493,811 | 2/1996 | Tobias et al. . | |
| 5,725,156 | * 3/1998 | Park | 47/48.5 |
| 5,806,240 | * 9/1998 | Racine | 47/79 |
| 5,921,443 | * 7/1999 | McMillan | 47/48.5 |

* cited by examiner

Primary Examiner—Michael J. Carone
Assistant Examiner—Joanne C. Downs

(57) ABSTRACT

A plant waterer apparatus includes a water container which includes a top container portion and a bottom container portion. A valve assembly is connected to the bottom container portion and is in communication with an interior of the water container. A clamp assembly is connected to the bottom container portion and is used for clamping the apparatus onto a rim of a pot which contains a plant. The water container includes a transparent container wall, and the transparent container wall includes indicia of volume. A container cap is attached to the top container portion, and the container cap includes an access channel. A drip hose is connected to the valve assembly. The water container and the clamp assembly are located symmetrically around a longitudinal axis. The clamp assembly includes a first clamping member and a second clamping member connected to the bottom container portion. The first clamping member includes a first clamp offset region which extends away from the longitudinal axis, and the second clamping member includes a second clamp offset region which extends away from the longitudinal axis and away from the first clamp offset region. When the clamp assembly is clamped onto a pot, the rim is clamped between the first clamp offset region and the second clamp offset region. The first clamping member and the second clamping member are made from spring wire. The valve assembly includes an externally operated valve handle and an internally controlled ball valve.

10 Claims, 3 Drawing Sheets

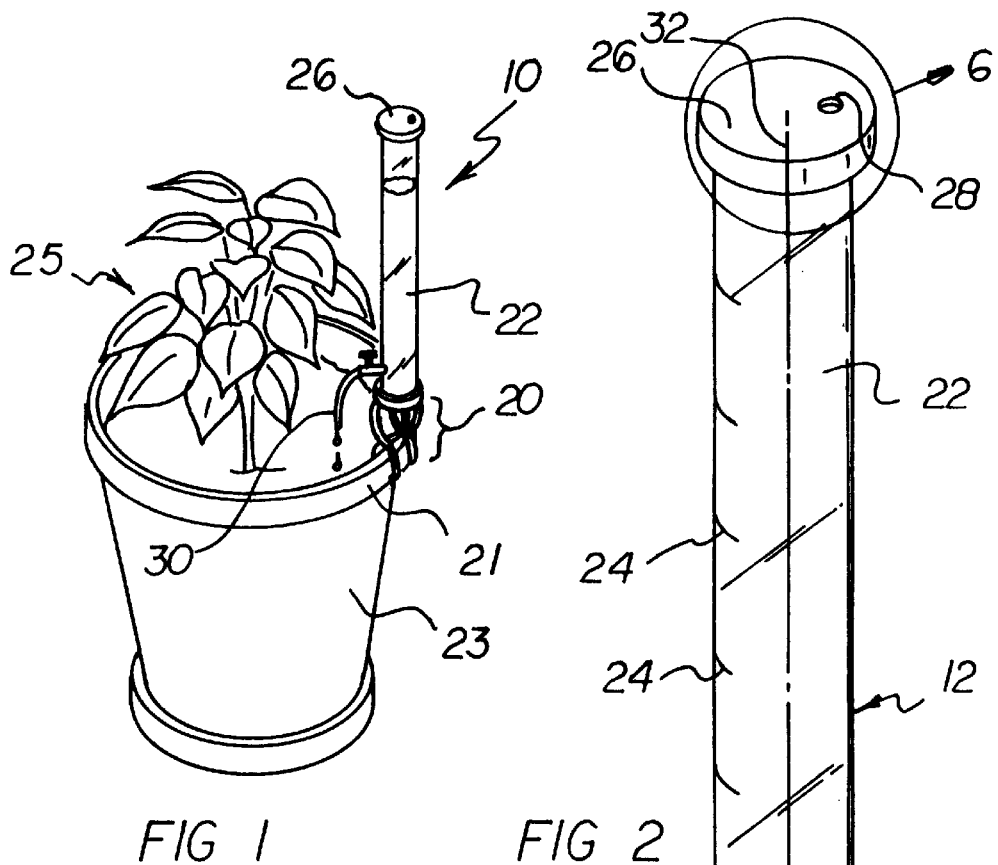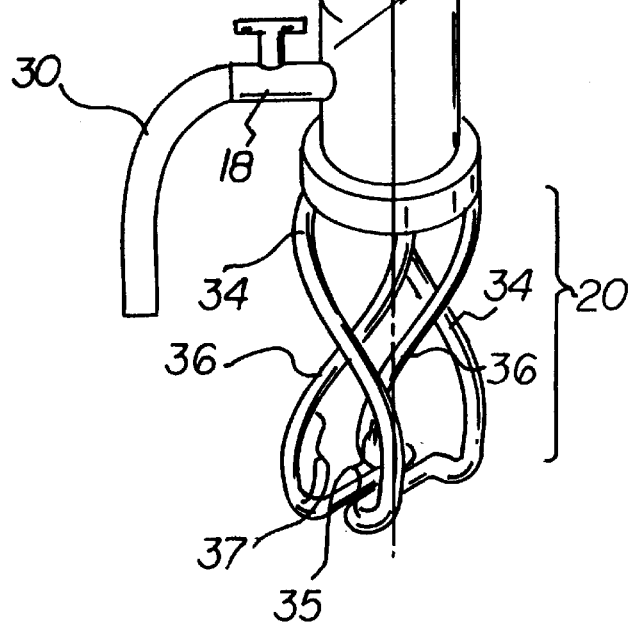

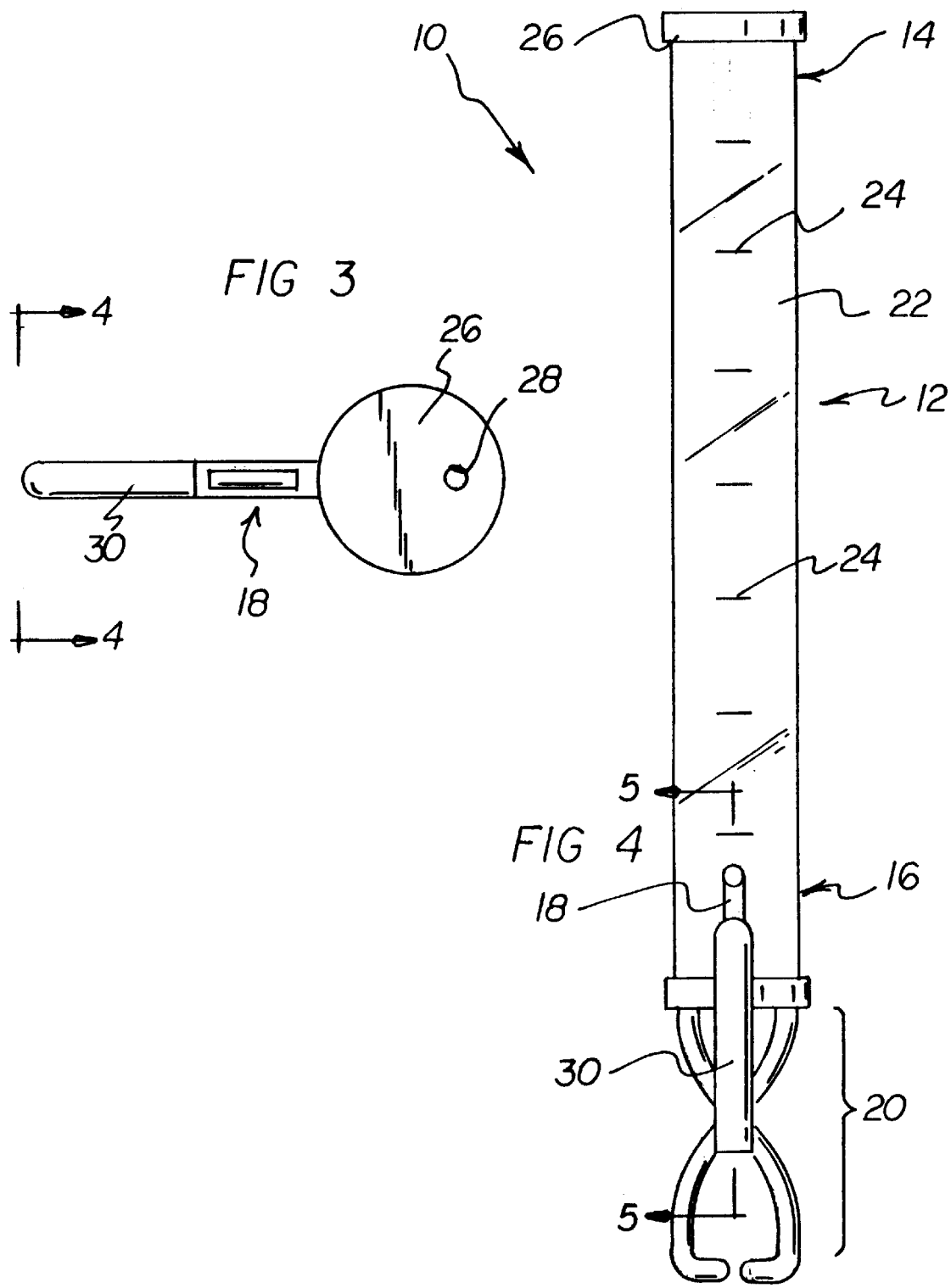

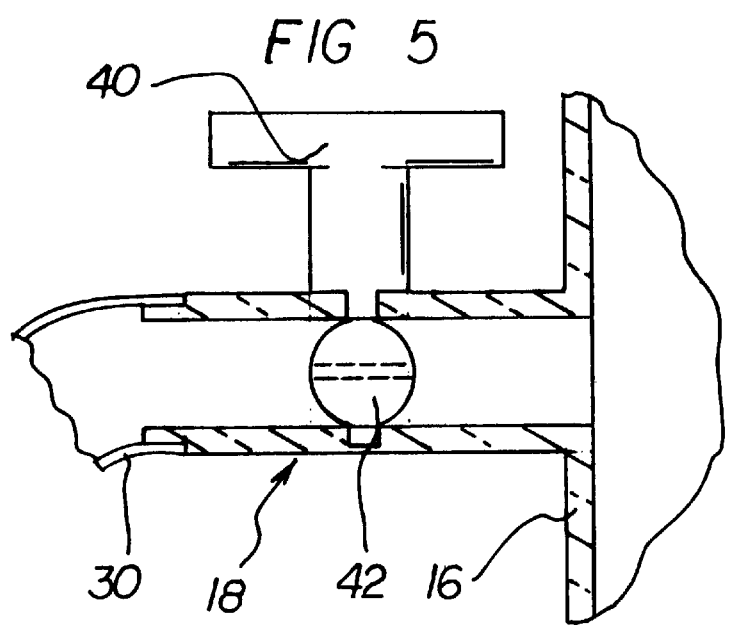
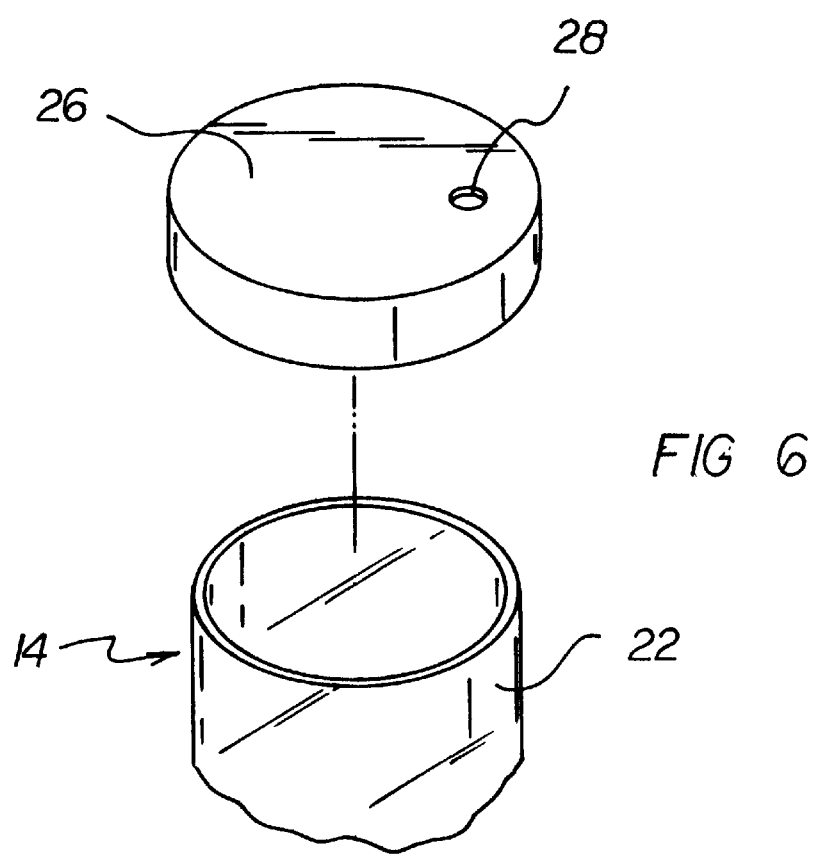

PLANT WATERER APPARATUS

BACKGROUND OF THE INVENTION

1. Field of the Invention

The present invention relates generally to watering devices, and, more particularly, to watering devices especially adapted for watering potted plants.

2. Description of the Prior Art

Plants that are grown indoors in pots don't receive natural rainfall and need to be watered periodically. Often plants are watered manually. However, a plant owner may not be able to manually water one's plants for a number of reasons. For example, a plant owner may wish to go on an extended vacation, and no one is available to manually water the plants. To accommodate such conditions, throughout the years, a number of innovations have been developed relating to watering potted plants automatically, and the following U.S. patents are representative of some of those innovations: U.S. Pat. Nos. 3,357,129, 5,097,626, 5,212,905, 5,421,122, and 5,493,811.

More specifically, each of U.S. Pat. No. 3,357,129 and U.S. Pat. No. 5,493,811 discloses an automatic plant watering device which employs a support leg which is pushed into the soil in a potted plant. Pushing such a support leg into the soil may have a number of undesirable consequences. The roots of the plant may be damaged. The soil may not be compact, and the support leg may tilt or fall. The material with which the support leg is made may decompose or leach out into the soil In this respect, it would be desirable if an automatic plant watering device were provided which does not employ a support leg which is driven into the soil of a potted plant.

U.S. Pat. No. 5,097,626 discloses an automatic plant watering device which employs a specially designed circular pot to receive a specially designed ring-shaped water tank that fits in the specially designed pot. Once the ring-like water tank is in position in the pot, the water level in the tank is difficult to see. As a result, it may be difficult to know when it is necessary to add more water to the tank. In this respect, it would be desirable if an automatic plant watering device that does not employ a ring-shaped tank that fits into a pot.

U.S. Pat. No. 5,212,905 discloses an automatic plant watering device that employs a relatively tall, ring-shaped water distributor, containing nozzles, that fits on top of a circular pot. The ring-shaped nature of the water distributor may cause the plants contained in the pot to be shielded from the sun. In addition, the water distributor is relatively tall, and such height may cause additional sun shielding. In this respect, it would be desirable if an automatic plant watering device were provided which does not include water distribution structures that extensively shield plants from sunlight.

U.S. Pat. No. 5,421,122 discloses an automatic plant watering device which is suspended from an overhead, suspended support. Often, overhead supports have a fixed location, such as a fixed position in a ceiling. Therefore, moving such overhead supports around in different locations in a room would be difficult. With such a support, moving potted plants around to other locations would also be difficult, without losing the benefits of the automatic plant watering device. In this respect, it would be desirable if an automatic plant watering device were provided which does not employ an overhead, suspended support.

Still other features would be desirable in an automatic plant waterer apparatus. For example, it would be desirable if an automatic plant watering device were provided that can readily be moved from one potted plant to another. Also, it would be desirable for an automatic plant watering device would have a transparent container for a water supply so that the remaining quantity of water in the container is readily visible. To facilitate attachment of a water supply to a plant pot and to facilitate removal of the water supply from the plant pot, it would be desirable if an automatic plant watering device were provided which would include a manually operated clamp for clamping the water supply to the pot. In addition, to carefully control the supply of water to the plant, it would be desirable if an automatic plant watering device included a manually variable valve for controlling water flow.

Thus, while the foregoing body of prior art indicates it to be well known to use automatic plant watering devices, the prior art described above does not teach or suggest a plant waterer apparatus which has the following combination of desirable features: (1) does not employ a support leg which is driven into the soil of a potted plant; (2) does not employ a ring-shaped tank that fits into a pot; (3) does not include water distribution structures that extensively shield plants from sunlight; (4) does not employ an overhead, suspended support; (5) can readily be moved from one potted plant to another; (6) has a transparent container for a water supply; (7) includes a manually operated clamp for clamping the water supply to the pot; and (8) includes a manually variable valve for controlling water flow. The foregoing desired characteristics are provided by the unique plant waterer apparatus of the present invention as will be made apparent from the following description thereof. Other advantages of the present invention over the prior art also will be rendered evident.

SUMMARY OF THE INVENTION

To achieve the foregoing and other advantages, the present invention, briefly described, provides a plant waterer apparatus which includes a water container which includes a top container portion and a bottom container portion. A valve assembly is connected to the bottom container portion and is in communication with an interior of the water container. A clamp assembly is connected to the bottom container portion.

The water container includes a transparent container wall, and the transparent container wall includes indicia of volume. A container cap is attached to the top container portion. The container cap includes an access channel. A drip hose is connected to the valve assembly. The water container and the clamp assembly are aligned along a longitudinal axis. More specifically, the water container and the clamp assembly are located symmetrically around the longitudinal axis.

The clamp assembly includes a first clamping member connected to the bottom container portion and a second clamping member connected to the bottom container portion. The first clamping member includes a first clamp offset region which extends away from the longitudinal axis, and the second clamping member includes a second clamp offset region which extends away from the longitudinal axis and away from the first clamp offset region. The first clamping member and the second clamping member are made from spring wire. The valve assembly includes an externally operated valve handle and an internally controlled ball valve.

The above brief description sets forth rather broadly the more important features of the present invention in order that the detailed description thereof that follows may be better understood, and in order that the present contributions to the art may be better appreciated. There are, of course, additional features of the invention that will be described hereinafter and which will be for the subject matter of the claims appended hereto.

In this respect, before explaining a preferred embodiment of the invention in detail, it is understood that the invention is not limited in its application to the details of the construction and to the arrangements of the components set forth in the following description or illustrated in the drawings. The invention is capable of other embodiments and of being practiced and carried out in various ways. Also, it is to be understood, that the phraseology and terminology employed herein are for the purpose of description and should not be regarded as limiting.

As such, those skilled in the art will appreciate that the conception, upon which disclosure is based, may readily be utilized as a basis for designing other structures, methods, and systems for carrying out the several purposes of the present invention. It is important, therefore, that the claims be regarded as including such equivalent constructions insofar as they do not depart from the spirit and scope of the present invention.

It is therefore an object of the present invention to provide a new and improved plant waterer apparatus which has all of the advantages of the prior art and none of the disadvantages.

It is another object of the present invention to provide a new and improved plant waterer apparatus which may be easily and efficiently manufactured and marketed.

It is a further object of the present invention to provide a new and improved plant waterer apparatus which is of durable and reliable construction.

An even further object of the present invention is to provide a new and improved plant waterer apparatus which is susceptible of a low cost of manufacture with regard to both materials and labor, and which accordingly is then susceptible of low prices of sale to the consuming public, thereby making such plant waterer apparatus available to the buying public.

Still yet a further object of the present invention is to provide a new and improved plant waterer apparatus which does not employ a support leg which is driven into the soil of a potted plant.

Still another object of the present invention is to provide a new and improved plant waterer apparatus that does not employ a ring-shaped tank that fits into a pot.

Yet another object of the present invention is to provide a new and improved plant waterer apparatus which does not include water distribution structures that extensively shield plants from sunlight.

Even another object of the present invention is to provide a new and improved plant waterer apparatus that does not employ an overhead, suspended support.

Still a further object of the present invention is to provide a new and improved plant waterer apparatus which can readily be moved from one potted plant to another.

Yet another object of the present invention is to provide a new and improved plant waterer apparatus that has a transparent container for a water supply.

Still another object of the present invention is to provide a new and improved plant waterer apparatus which includes a manually operated clamp for clamping the water supply to the pot.

Yet another object of the present invention is to provide a new and improved plant waterer apparatus that includes a manually variable valve for controlling water flow.

These together with still other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there are illustrated preferred embodiments of the invention.

BRIEF DESCRIPTION OF THE DRAWINGS

The invention will be better understood and the above objects as well as objects other than those set forth above will become more apparent after a study of the following detailed description thereof. Such description makes reference to the annexed drawing wherein:

FIG. 1 is a perspective view showing a preferred embodiment of the plant waterer apparatus of the invention clamped onto the rim of a plant pot.

FIG. 2 is an enlarged perspective view of the embodiment of the plant waterer apparatus shown in FIG. 1 removed from the plant pot.

FIG. 3 is a top view of the embodiment of the plant waterer apparatus of FIG. 2.

FIG. 4 is a front view of the embodiment of the invention shown in FIG. 3 taken along line 4—4 thereof.

FIG. 5 is an enlarged, partial cross-sectional view of the embodiment of the invention shown in FIG. 4 taken along line 5—5 thereof.

FIG. 6 is an enlarged, partially exploded, partial perspective view, of circled region 6 in FIG. 1.

DESCRIPTION OF THE PREFERRED EMBODIMENT

With reference to the drawings, a new and improved plant waterer apparatus embodying the principles and concepts of the present invention will be described.

Turning to FIGS. 1–6, there is shown an exemplary embodiment of the plant waterer apparatus of the invention generally designated by reference numeral 10. In its preferred form, plant waterer apparatus 10 includes a water container 12 which includes a top container portion 14 and a bottom container portion 16. A valve assembly 18 is connected to the bottom container portion 16 and is in communication with an interior of the water container 12. A clamp assembly 20 is connected to the bottom container portion 16. As shown in FIG. 1, the clamp assembly 20 is clamped onto the rim 21 of a pot 23 which includes a plant 25 therein.

The water container 12 includes a transparent container wall 22, and the transparent container wall 22 includes indicia 24 of volume. A container cap 26 is attached to the top container portion 14. The container cap 26 includes an access channel 28. A drip hose 30 is connected to the valve assembly 18. The water container 12 and the clamp assembly 20 are aligned along a longitudinal axis 32. More specifically, the water container 12 and the clamp assembly 20 are located symmetrically around the longitudinal axis 32.

The clamp assembly 20 includes a first clamping member 34 connected to the bottom container portion 16 and a second clamping member 36 connected to the bottom container portion 16. The first clamping member 34 includes a first clamp offset region 35 which extends away from the longitudinal axis 32, and the second clamping member 36 includes a second clamp offset region 37 which extends away from the longitudinal axis 32 and away from the first clamp offset region 35. The first clamping member 34 and the second clamping member 36 are made from spring wire. The valve assembly 18 includes an externally operated valve handle 40 and an internally controlled ball valve 42.

To use the plant waterer apparatus 10 of the invention, a pot 23 is obtained which contains a plant 25. Preferably, the pot 23 contains a rim 21 which extends outward from the pot 23. Then, the first clamping member 34 is grasped in one hand, and the second clamping member 36 is grasped in the other hand. The clamping members are brought to the rim 21 and lowered thereon. Then, the clamping members are released. As a result, the clamp assembly 20 clamps onto the rim 21 with the rim 21 clamped between the first clamp offset region 35 and the second clamp offset region 37. As a result, the plant waterer apparatus 10 is clamped onto the pot 23. The container cap 26 is removed and water is added to the water container 12. The indicia 24 and the transparent nature of the transparent container wall 22 permit the quantity of water added to the water container 12 to be visible. The container cap 26 is then replaced. If desired, a thermometer can be placed through the access channel 28 to measure the temperature of the water.

Then, the valve handle 40 is manually turned to control the ball valve 42 so that water flows out the drip hose 30. Preferably, the valve assembly 18 is controlled so that water emerges from the drip hose 30 in a drop by drop manner.

If it is desired to remove the plant waterer apparatus 10 from the pot 23, the first clamping member 34 and the second clamping member 36 are pulled apart so that the clamping action on the rim 21 is released, and the plant waterer apparatus 10 is lifted off of the pot 23.

The components of the plant waterer apparatus of the invention can be made from inexpensive and durable metal and plastic materials.

As to the manner of usage and operation of the instant invention, the same is apparent from the above disclosure, and accordingly, no further discussion relative to the manner of usage and operation need be provided.

It is apparent from the above that the present invention accomplishes all of the objects set forth by providing a new and improved plant waterer apparatus that is low in cost, relatively simple in design and operation, and which may advantageously be used without employing a support leg which is driven into the soil of a potted plant. With the invention, an automatic plant waterer apparatus is provided which does not employ a ring-shaped tank that fits into a pot. With the invention, an automatic plant waterer apparatus is provided which does not include water distribution structures that extensively shield plants from sunlight. With the invention, an automatic plant waterer apparatus is provided which does not employ an overhead, suspended support. With the invention, an automatic plant waterer apparatus is provided which can readily be moved from one potted plant to another. With the invention, an automatic plant waterer apparatus is provided which has a transparent container for a water supply. With the invention, an automatic plant waterer apparatus is provided which includes a manually operated clamp for clamping the water supply to the pot. With the invention, an automatic plant waterer apparatus is provided which includes a manually variable valve for controlling water flow.

Thus, while the present invention has been shown in the drawings and fully described above with particularity and detail in connection with what is presently deemed to be the most practical and preferred embodiment(s) of the invention, it will be apparent to those of ordinary skill in the art that many modifications thereof may be made without departing from the principles and concepts set forth herein, including, but not limited to, variations in size, materials, shape, form, function and manner of operation, assembly and use.

Hence, the proper scope of the present invention should be determined only by the broadest interpretation of the appended claims so as to encompass all such modifications as well as all relationships equivalent to those illustrated in the drawings and described in the specification.

Finally, it will be appreciated that the purpose of the annexed Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. Accordingly, the Abstract is neither intended to define the invention or the application, which only is measured by the claims, nor is it intended to be limiting as to the scope of the invention in any way.

What is claimed as being new and desired to be protected by Letters Patent of the United States is as follows:

1. A plant waterer apparatus, comprising:
    a water container which includes a top container portion and a bottom container portion,
    a valve assembly connected to said bottom container portion and in communication with an interior of said water container, and
    a clamp assembly connected to said bottom container portion wherein said water container and said clamp assembly are aligned along a longitudinal axis and wherein said clamp assembly includes: a first downwardly extending clamping member connected to said bottom container portion, and a second downwardly extending clamping member opposed to said first clamping member and connected to said bottom container portion, said clamp assembly adapted for attaching said water container to a rim of a plant pot.

2. The apparatus of claim 1 wherein said water container includes a transparent container wall.

3. The apparatus of claim 2 wherein said transparent container wall includes indicia of volume.

4. The apparatus of claim 1, further including:
    a container cap attached to said top container portion.

5. The apparatus of claim 4 wherein said container cap includes an access channel.

6. The apparatus of claim 1, further including:
    a drip hose connected to said valve assembly.

7. The apparatus of claim 1 wherein said water container and said clamp assembly are located symmetrically around said longitudinal axis.

8. The apparatus of claim 1 wherein:
    said first clamping member includes a first clamp offset region which extends away from said longitudinal axis, and
    said second clamping member includes a second clamp offset region which extends away from said longitudinal axis and away from said first clamp offset region.

9. The apparatus of claim 1 wherein said first clamping member and said second clamping member are made from spring wire.

10. The apparatus of claim 1 wherein said valve assembly includes:
    an externally operated valve handle, and
    an internally controlled ball valve.

* * * * *